(12) United States Patent
Klingbeil (10) Patent No.: US 8,944,036 B2
(45) Date of Patent: Feb. 3, 2015

(54) EXHAUST GAS RECIRCULATION IN A RECIPROCATING ENGINE WITH CONTINUOUSLY REGENERATING PARTICULATE TRAP

(75) Inventor: Adam Edgar Klingbeil, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 436 days.

(21) Appl. No.: 13/408,637

(22) Filed: Feb. 29, 2012

(65) Prior Publication Data

US 2013/0220288 A1 Aug. 29, 2013

(51) Int. Cl.
*F02M 25/07* (2006.01)
*F02B 47/08* (2006.01)

(52) U.S. Cl.
USPC ............... 123/568.12; 123/294; 60/274

(58) Field of Classification Search
CPC .......... F02M 25/0707; F02M 25/0731; F02M 25/0737; Y02T 10/121
USPC .......... 123/568.11, 568.12, 567.15, 568.17, 123/294; 60/605.2, 274, 278; 701/108
See application file for complete search history.

(56) References Cited

U.S. PATENT DOCUMENTS

| | | | |
|---|---|---|---|
| 4,771,602 A | 9/1988 | Ruiz et al. | |
| 5,205,265 A | 4/1993 | Kashiyama et al. | |
| 5,845,495 A * | 12/1998 | Schray et al. | .......... 60/612 |
| 6,425,381 B1 | 7/2002 | Rammer | |
| 6,474,060 B2 | 11/2002 | Khair | |
| 6,625,978 B1 | 9/2003 | Eriksson et al. | |
| 6,739,125 B1 | 5/2004 | Mulligan | |
| 6,742,335 B2 | 6/2004 | Beck et al. | |
| 6,904,898 B1 | 6/2005 | Sahlen | |
| 7,945,376 B2 | 5/2011 | Geyer et al. | |
| 8,096,124 B2 * | 1/2012 | Pierpont et al. | ............. 60/605.2 |
| 8,752,377 B2 * | 6/2014 | Laube et al. | .................. 60/612 |
| 2005/0103013 A1 * | 5/2005 | Brookshire et al. | ......... 60/605.2 |
| 2006/0021347 A1 * | 2/2006 | Sun et al. | ...................... 60/612 |
| 2006/0123788 A1 * | 6/2006 | Gobert et al. | .................. 60/612 |
| 2006/0124115 A1 * | 6/2006 | Brookshire et al. | ...... 123/568.12 |
| 2006/0266019 A1 * | 11/2006 | Ricart-Ugaz | .................. 60/278 |
| 2007/0044469 A1 * | 3/2007 | Harada et al. | .................. 60/599 |
| 2007/0163258 A1 * | 7/2007 | Narita et al. | .................. 60/612 |
| 2007/0295001 A1 * | 12/2007 | Newman | ........................ 60/280 |
| 2008/0098733 A1 * | 5/2008 | Dickerson | ...................... 60/602 |
| 2009/0019839 A1 | 1/2009 | Gray, Jr. | |
| 2009/0199825 A1 | 8/2009 | Piper et al. | |
| 2009/0308070 A1 | 12/2009 | Alger, II et al. | |
| 2011/0041495 A1 | 2/2011 | Yager | |
| 2011/0088391 A1 * | 4/2011 | Sumser et al. | .................. 60/602 |
| 2012/0125301 A1 * | 5/2012 | Ide et al. | .................. 123/568.21 |
| 2012/0222659 A1 * | 9/2012 | Kulkarni et al. | ......... 123/568.11 |
| 2013/0047959 A1 * | 2/2013 | Holm | ............................ 123/445 |

* cited by examiner

*Primary Examiner* — John Kwon
*Assistant Examiner* — Johnny H Hoang
(74) *Attorney, Agent, or Firm* — Joseph J. Christian (57) ABSTRACT

An engine and a method of operating an engine. One method includes: routing air to both a donor and a non-donor cylinder of an engine; combusting an air fuel mixture in the cylinders; routing exhaust gas from the non-donor cylinder through an exhaust manifold; and recirculating exhaust gas from the donor cylinder through an aftertreatment system and a cooler back to the intake manifold. Another method includes: recirculating exhaust gas from a first cylinder of an engine to an intake stream or air-fuel mixture of the engine, whereby: the recirculated exhaust gas from the first cylinder flows through an after treatment system; and the recirculated exhaust gas is cooled to a lower temperature after the after treatment system; and routing exhaust gas from the second cylinder through an exhaust manifold.

56 Claims, 6 Drawing Sheets

EXHAUST GAS RECIRCULATION IN A RECIPROCATING ENGINE WITH CONTINUOUSLY REGENERATING PARTICULATE TRAP

BACKGROUND OF THE INVENTION

The present invention relates generally to reciprocating engines and more particularly to an exhaust gas recirculation system with a continuously regenerating particulate trap for use with a reciprocating engine.

Exhaust gas recirculation (EGR) is a powerful tool for reducing $NO_x$ emissions substantially in combustion devices (e.g., reciprocating engines) by reducing flame temperature thereby reducing the rate at which the $NO_x$ is generated. There are various approaches for employing EGR on a reciprocating engine.

One approach for implementing EGR is through the use of one or more donor cylinders which pump all of their exhaust emissions through an EGR cooler and then into the intake manifold. This approach can improve pumping efficiencies compared to some alternative approaches.

A drawback of EGR can be the fouling of the EGR system. While particulate reduction technologies are implemented in the engine exhaust stream (non-EGR stream), they do little to address the EGR fouling. Workarounds to address EGR fouling include scheduled maintenance to clean the EGR system and/or increased frequency of oil changes. Additional approaches include designing EGR systems that account for the increased level of fouling including additional oil filters, larger oil storage, and larger EGR coolers.

Accordingly, there is an ongoing need for improving the overall performance of reciprocating engines that use EGR.

BRIEF DESCRIPTION

The present invention overcomes at least some of the aforementioned drawbacks by providing an exhaust gas recirculation (EGR) configuration for a reciprocating engine that improves up the current designs. More specifically, the present invention is directed to provide various methods and an engine that provides EGR for use with a reciprocating engine that employs a continuously regenerating particulate trap.

Therefore, in accordance with one aspect of the invention, a method comprises: flowing exhaust gas from a first cylinder of a reciprocating engine through an after treatment system; cooling the exhaust gas after the after treatment system; recirculating the exhaust gas from the first cylinder to an intake stream or air-fuel mixture of the first cylinder and a second cylinder of the reciprocating engine; routing exhaust gas from the second cylinder through a turbine; compressing the intake stream or air-fuel mixture to the first cylinder and the second cylinder with a compressor, wherein the compressor is operatively attached to the turbine.

In accordance with another aspect of the invention, an engine comprises: a first reciprocating cylinder; a second reciprocating cylinder; an exhaust manifold, configured to provide an egress path for exhaust emissions from the first reciprocating cylinder and the second reciprocating cylinder; an intake manifold, configured to provide an input path for an air fuel mixture to the first reciprocating cylinder and the second reciprocating cylinder; and an exhaust gas recirculating (EGR) subsystem comprising: an after treatment system; and an EGR cooler in series with said after treatment system, wherein the EGR subsystem routes exhaust emissions from the first reciprocating cylinder back to the intake manifold.

In accordance with another aspect of the invention, a method comprises: routing air to a donor cylinder and a non-donor cylinder of a reciprocating engine; combusting an air fuel mixture in the donor cylinder and the non-donor cylinder; routing exhaust gas from the non-donor cylinder through an exhaust manifold; and recirculating exhaust gas from the donor cylinder through an aftertreatment system and a cooler back to the intake manifold of the donor cylinder and the non-donor cylinder.

In accordance with another aspect of the invention, a method comprises: recirculating exhaust gas from a first cylinder of a reciprocating engine to an intake stream or air-fuel mixture of the first cylinder and a second cylinder of the reciprocating engine, whereby: the recirculated exhaust gas from the first cylinder flows through an after treatment system; and the recirculated exhaust gas is cooled to a lower temperature after the after treatment system; and routing exhaust gas from the second cylinder through an exhaust manifold.

In accordance with another aspect of the invention, a method comprises: flowing recirculating exhaust gas from a first cylinder of a reciprocating engine through an after treatment system; cooling the recirculating exhaust gas after the after treatment system; recirculating exhaust gas from a first cylinder of the reciprocating engine to a compressor; routing exhaust gas from the second cylinder through a turbine; and compressing the intake stream or air-fuel mixture to the first cylinder and the second cylinder and the recirculating exhaust gas with a compressor, wherein the compressor is operatively attached to the turbine.

In accordance with another aspect of the invention, a method comprises: recirculating exhaust gas from a first cylinder of a reciprocating engine back to the reciprocating engine; flowing the recirculating exhaust gas through an after treatment system and a first turbine; cooling the recirculating exhaust gas after the first turbine; compressing the recirculating exhaust gas after the cooling with a first compressor, wherein the first compressor is operatively attached to the first turbine; recirculating the compressed recirculating exhaust gas to the intake stream or air-fuel mixture to the first cylinder and the second cylinder; routing exhaust gas from the second cylinder through a second turbine; and compressing the intake stream or air-fuel mixture of the second cylinder with a second compressor, wherein the compressor is operatively attached to the second turbine.

Various other features and advantages of the present invention will be made apparent from the following detailed description and the drawings.

BRIEF DESCRIPTION OF THE DRAWINGS

The drawings illustrate one embodiment presently contemplated for carrying out the invention.

DETAILED DESCRIPTION

Aspects of the present invention have been shown to offer advantages over previous methodologies of exhaust gas recirculation (EGR) for reciprocating engines. The engine and method include continuously regenerating particulate trap within the EGR system, thereby allowing lower air-fuel ratios to be used with any donor cylinders. Ultimately, the performance of the reciprocating engine, both in emissions and fuel efficiency, can be improved.

In an embodiment the strategy entails running any donor cylinder(s) at a lower air-fuel ratio than the non-donor cylinder(s) and employing an aftertreatment system between the donor cylinders and the EGR cooler. The aftertreatment system may comprise diesel oxidation catalysts and diesel particulate filters.

In this manner, by running the donor cylinder(s) at a lower air-fuel ratio, the $NO_x$ emissions will be reduced, but particulate and exhaust temperatures will be high. In turn, the lowered $NO_x$ emissions will enable advancement of the injection timing, resulting in improved fuel economy in both non-donor and donor cylinders. The high particulate matter may be collected by the diesel particulate filtration; but, due to the high exhaust gas temperatures, the particulate will be efficiently trapped and oxidized continuously. In turn, the EGR cooler will be kept cleaner and proper optimization leads to improved overall engine performance for the reciprocating engine. An additional benefit, due to the air-fuel ratio in the donor cylinders being less than that in the non-donor cylinders, is that the EGR will be more effective in reducing $NO_x$ for the non-donor cylinders.

Aspects of the present invention address several problems with the strategy. Oil contamination, due to acids and solid particulates from the exhaust, and EGR cooler fouling is improved by cleaning the EGR stream. Second, the overall effectiveness of the EGR is improved because the oxygen concentration of the EGR is reduced so all of the cylinders will produce less $NO_x$. Finally, the fuel efficiency of the donor cylinders is improved by advancing the injection timing because the lower air-fuel ratio in the donor cylinders will produce less $NO_x$.

The strategy employed by aspects of the present invention include making the EGR more effective and the $NO_x$/Specific Fuel Consumption (SFC) tradeoff of the donor cylinders may be improved. Additionally, the reliability issues often associated with EGR cooler fouling and with lube oil contamination are significantly reduced. Since passive regeneration is used, the implementation challenges are minimized. By allowing the air-fuel ratio of the non-donor cylinders to be higher, the particulate coming out from the non-donor cylinders, in turn, is lower and thus the engine-out particulate levels will be lower, as well.

Although embodiments described herein use a donor/non-donor cylinder configuration, other embodiments could be used in a reciprocating engine that has a "regular" engine configuration (i.e., no donor/non-donor cylinder distinction).

Figure 1:
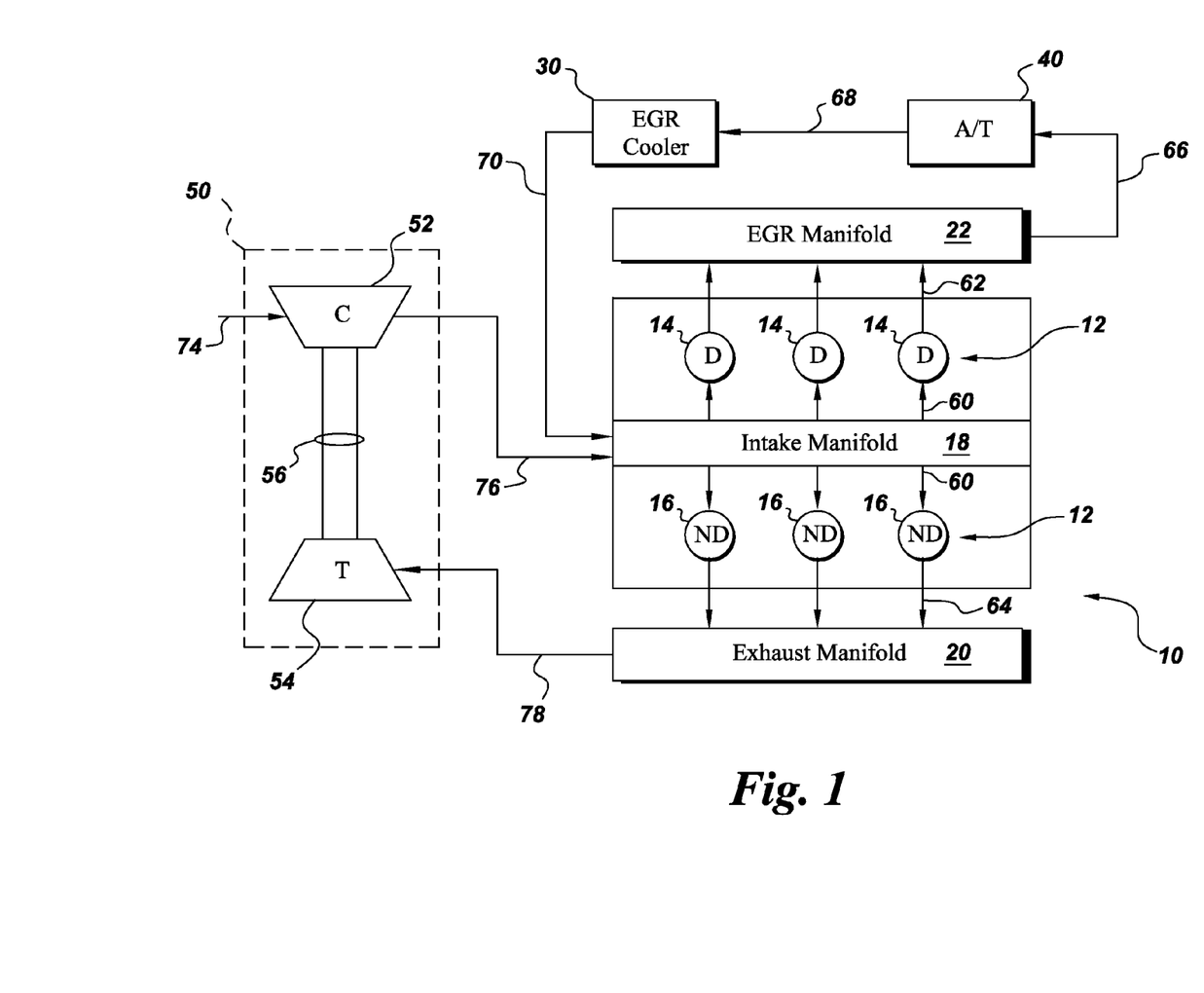
FIG. 1 is a schematic diagram of an embodiment of a reciprocating engine incorporating aspects of the present invention.

Referring to FIG. 1, a schematic diagram of an embodiment of a reciprocating engine employing aspects of the present invention is shown. The engine 10 comprises a plurality of cylinders 12, of which are at least one donor cylinder 14 (labeled "D") and at least one non-donor cylinder 16 (labeled "ND"). The engine 10 further comprises an intake manifold 18, an exhaust manifold 20, and an EGR manifold 22. The engine 10 further comprises an aftertreatment system 40 and an EGR cooler 30 in series.

The engine 10 further comprises a turbocharger 50 comprising a compressor 52 and a turbine 54. The compressor 52 and the turbine 54 are operatively attached via a shaft 56, such that the rotational energy of the turbine 54 is used to drive the compressors 52. The compressor 52 receives air 74 and supplies compressed air 76 at a pressure to the cylinders 14, 16 via intake manifold 18. For start-up and low-load operating conditions, the engine 10 may use additional means to drive the compressor 52 such as, for example, an electric motor or other mechanism which transmits power from the crankshaft 56 to the compressor 52 at a low speed.

Intake air 74 to the engine 10 flows through the compressor 52 and is thereby compressed as it then enters, via flow 76, to the intake manifold 18. An intake stream in the intake manifold 18 is distributed to the plurality of cylinders 12 including both the donor cylinder 14 and non-donor cylinder 16 as shown by flow arrow 60. Exhaust stream from the donor cylinders 14, as indicated by arrow 62, flows to the EGR manifold 22. From the EGR manifold 22 the exhaust stream 66 flows to the aftertreatment system 40 and then the after-treated exhaust stream 68 flows to the EGR cooler 30. After the EGR cooler 30, the cooled exhaust stream 70 is returned to the intake manifold 18 and both sets of cylinders 14, 16 beyond. In this manner, the exhaust stream from the donor cylinders 14 is treated and cleaned, via the aftertreatment system 40, thereby reducing contamination of the oil and EGR cooler and improving engine reliability.

Separately, the exhaust stream 64 from the non-donor cylinders 16 is routed through the exhaust manifold 20 and then, via flow 78, to drive the turbine 54.

Figure 2:
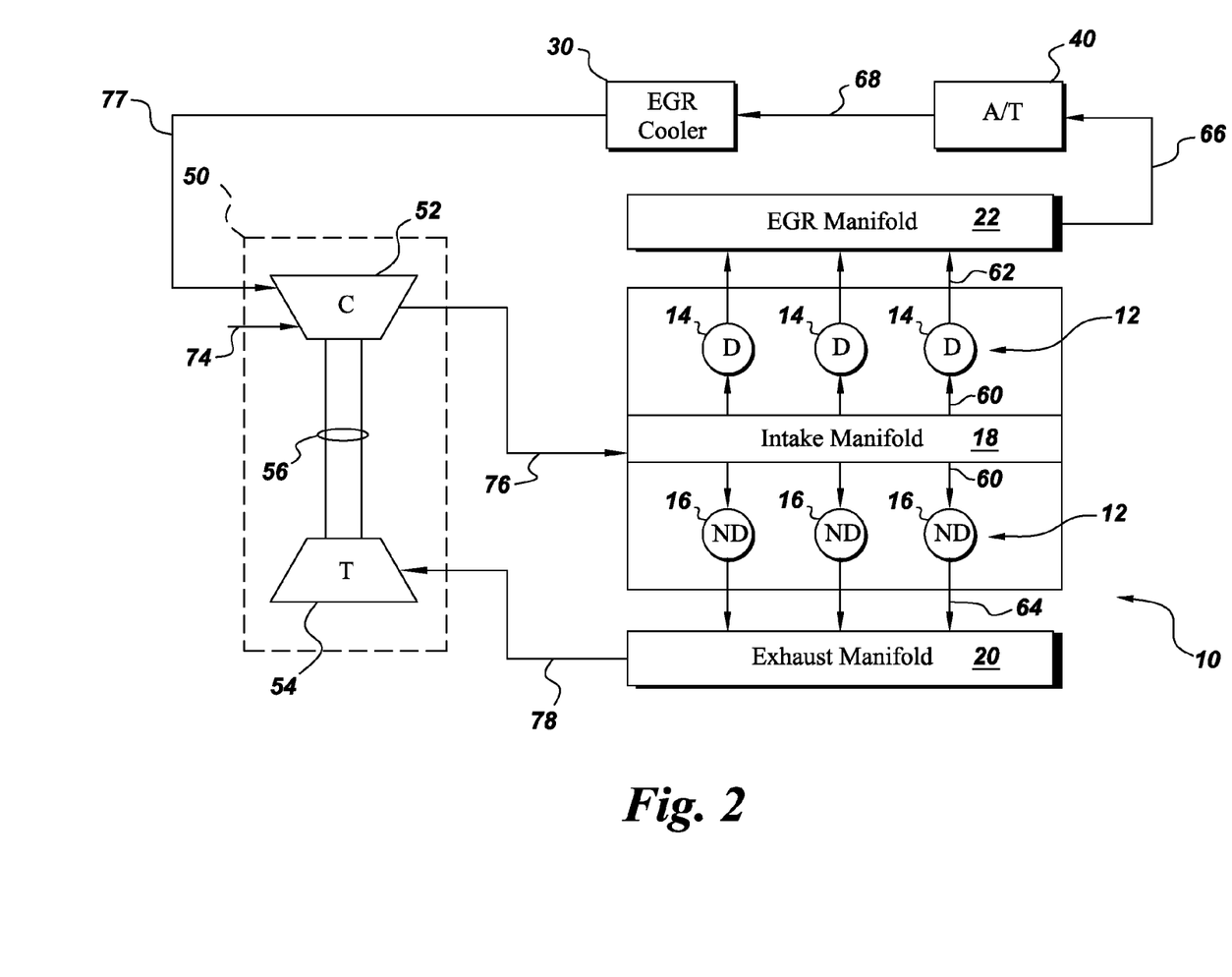
FIG. 2 is a schematic diagram of another embodiment of a reciprocating engine incorporating aspects of the present invention.

Another embodiment of an engine 10 is schematically illustrated in FIG. 2. The engine 10 in FIG. 2 is similar to the embodiment depicted in FIG. 1, except that cooled exhaust gas leaving the EGR cooler 30 is instead routed, via 77, to the compressor 52. In the compressor 52, both the recirculated exhaust gas 77 from the donor cylinders 14 and fresh air 74 may be compressed and then routed, via 76 to the intake manifold 18. That is the recirculated exhaust gas leaving the EGR cooler 30 is not routed directly to the intake manifold 18, via line 70 as shown in FIG. 1.

Figure 3:
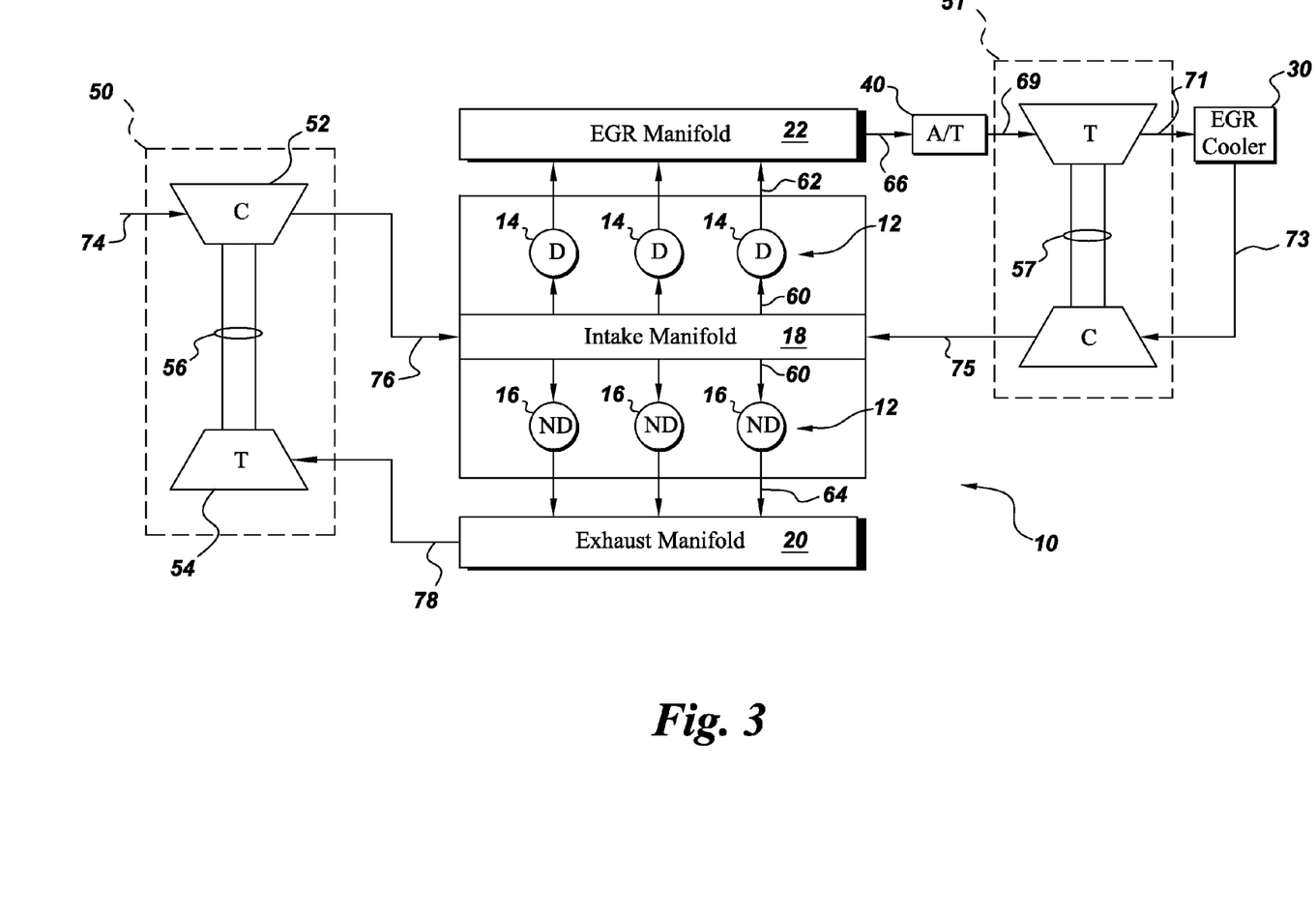
FIG. 3 is a schematic diagram of another embodiment of a reciprocating engine incorporating aspects of the present invention.

Another embodiment of an engine 10 is schematically illustrated in FIG. 3. The engine 10 in FIG. 3 is similar to the embodiments depicted in FIGS. 1 and 2, except that a second turbocharger 51 may be employed. The second turbocharger 51 may comprise a compressor 52 and a turbine 54 operatively connected by a shaft 57. In this embodiment, exhaust gas 66 from the EGR manifold 22 is recirculated through an after treatment system 40 and then, via route 69, is routed through turbine 54 and then through EGR cooler 30. The cooled, exhaust gas 73 then is routed through compressor 52 of the second turbocharger 51. From the compressor 52 of the second turbocharger 51, the exhaust gas is routed, via 75, back to the intake manifold 18 of the engine 10.

For illustrative purposes only, FIGS. 1-3 show the engine 10 having a quantity of three donor cylinders 14 and three non-donor cylinders 16. It should be apparent that virtually any other combination of quantities of donor and non-donor cylinders may be employed without departing from aspects of the present invention. The quantity of donor cylinders 14 and non-donor cylinders 16 may be as small as one cylinder each. Additionally, while FIGS. 1-3 depicts an engine 10 that has a block of three donor cylinders 14 and a block of three non-donor cylinders 16, various embodiments may have unequal quantities of donor cylinders 14 and non-donor cylinders 16. For example, in an embodiment wherein the engine 10 has a V-configuration, one bank of cylinders of the V-shaped engine 10 may be all donor cylinders 14 while the other bank of cylinders of the V-shaped engine 10 may be all non-donor cylinders 16. In this manner, all the cylinders 14, 16, for example, share a common crank shaft, and other elements of the engine 10. Further, the donor cylinders 14 and non-donor cylinders 16 need not all be common to one block. In embodiments, donor cylinders 14 and non-donor cylinders 16 may be situated in piecemeal and/or non-symmetric fashion in the engine 10.

Additionally, for illustrative purposes only, FIGS. 1-3 show engine 10 having one or more turbochargers (i.e. turbine coupled to a compressor). In other embodiments, at least one supercharger may be used in lieu of a turbocharger. That is a compressor may be used, wherein the compressor is not driven by a mechanically-coupled to a turbine, as is the case with the turbocharger. For example, one or more compressors may be used wherein the compressor is one of electrically, mechanically, and pneumatically driven.

Similarly, in other embodiments the engine 10 may be a naturally aspirated reciprocating engine. That is there may be neither a turbocharger nor a supercharger to compress any intake air in particular embodiments.

The cooling means 30 employed may comprise an EGR cooler. Alternatively, the cooling means 30 may comprise a waste recovery device such as an organic Rankine cycle-based generator or a thermo-electric generator, or may include a mixing manifold to mix cool gasses or an evaporating liquid (e.g., water) with the hot exhaust gas so as to cool the exhaust gas.

Various fuel and fuel combinations may be used on embodiments of the engine 10. In an embodiment, all cylinders 14, 16 of the engine 10 may operate on a single fuel or combination of fuels. That is, at a given operating situation, all the cylinders 14, 16 may be operating on the same fuel or combination of fuels. For example, the cylinders 14, 16 may all operate on a single fuel such as diesel fuel, gasoline fuel, and the like. Similarly, the cylinders 14, 16 may all operate on a mixture, or combination or plurality of fuels, wherein at least one of the fuels of the combination or plurality of fuels comprise diesel fuel, gasoline fuel, natural gas, ethanol, syngas, landfill gas, a $CO/H_2$ mixture, methanol, a single component alcohol, a blended alcohol, and the like, and/or combinations thereof. In an embodiment, the plurality of fuels that are used in the cylinders 14, 16 may comprise diesel and one of natural gas and ethanol.

Similarly, in another embodiment, the donor cylinder 14 and non-donor cylinder 16 and the engine 10 may be configured such that one or both of the donor cylinder 14 and non-donor cylinder 16 may operate on different fuel(s) or fuel combination(s) at different times.

Aspects of the present invention allow for the donor cylinder 14 and the non-donor cylinder 16 to be run at different air-fuel ratios. The air-fuel ratio of the donor cylinder 14 may be allowed to run more rich than the non-donor cylinder 16. For example, the engine may be configured such that the donor cylinder 14 may have an air fuel mixture having a first air/fuel ratio and the non-donor cylinder 16 may have an air fuel mixture having a second air/fuel ratio, wherein the first air/fuel ratio is less than the second air/fuel ratio. For example, suppose that a stoichiometric condition in a cylinder 12 of the engine 10 has an air-fuel ratio or value of fifteen (15), then the donor cylinder 14 may be run at an air-fuel ratio or value of eighteen (18), while the non-donor cylinder 16 may be run at an air-fuel ratio or value of twenty five (25). By lowering the air-fuel ratio of the donor cylinder 14, the $NO_x$ emissions is reduced, but particulate and exhaust temperatures will be higher. The lowered $NO_x$ emissions will enable advancement of injection timing for improved fuel efficiency on both donor cylinder 14 and/or non-donor cylinder 16. The high particulate matter may be collected in after treatment system 40, but because the exhaust gas temperatures are very high, the particulate will be trapped and oxidized continuously. Concomitantly, the EGR cooler is kept cleaner and proper optimization leads to improved overall engine performance. Because the air-fuel ratio of the donor cylinder 14 is low, or lower, compared to the air-fuel ratio of the non-donor cylinder 16, the EGR will be more effective in reducing $NO_x$ for the non-donor cylinders 16.

Note that there are a variety of embodiments for effectively reducing the air-fuel ratio of the donor cylinder 14 without departing from aspects of the invention. By example only, the flow of fresh air to the donor cylinder 14 may be restricted and/or reduced. Alternatively, the intake valve lift and/or timing may be changed so as to effect this change. Similarly, the fuel supplied to the donor cylinder 14 may be increased.

In an embodiment, the engine 10 may be configured such that at least one fuel (e.g., diesel) is directly injected in at least one of the donor cylinder 14 and the non-donor cylinder 16. In this embodiment, injection timing to the donor cylinder 14 may be retarded and/or injection timing to the non-donor cylinder 16 may be advanced. As a result of the alteration of injection timing in at least one of the cylinders 14, 16, an amount of fuel supplied to the donor cylinder 14 may be increased and/or an amount of fuel supplied to the non-donor cylinder 16 may be decreased. The alteration of fuel amount supplied to cylinders 14, 16 may be quantified such that a predetermined power output from the engine 10 is maintained.

Figure 4A:
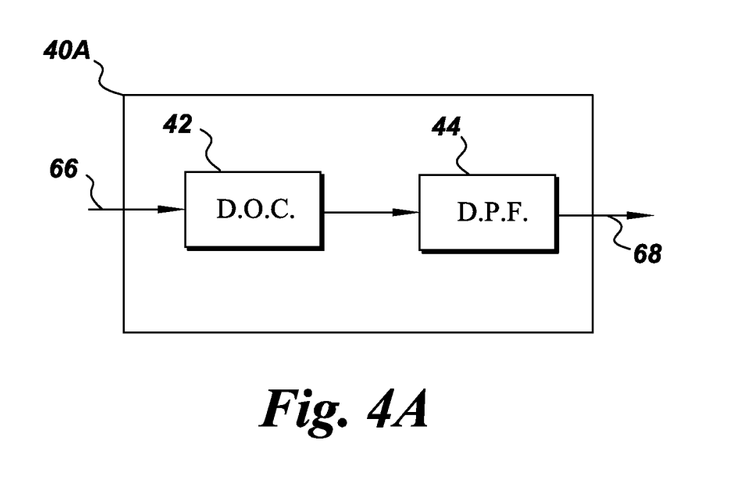
FIG. 4A is a schematic diagram of an embodiment of an after treatment component incorporating aspects of the present invention.
Figure 4B:
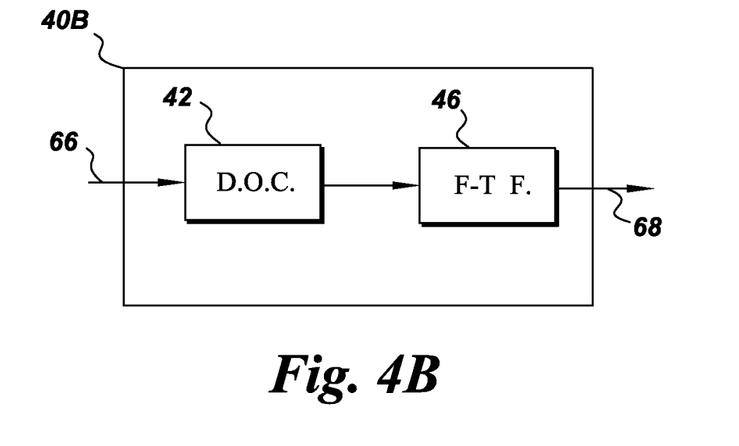
FIG. 4B is a schematic diagram of another embodiment of an after treatment component incorporating aspects of the present invention.

Referring to FIGS. 4A and 4B, two different embodiments of an aftertreatment system 40 are depicted. For example, FIG. 4A shows an aftertreatment system 40A that comprises a diesel oxidation catalyst 42 (depicted as "D.O.C.") in series with a diesel particulate filter 44 (depicted as "D.P.F."). In this manner, the exhaust stream 66 from the EGR manifold 22 (See FIGS. 1-2) flows through the diesel oxidation catalyst 42, then through the diesel particulate filter 44 and then flows, via arrow 68, to the EGR cooler 30 (See FIGS. 1-2).

Alternatively, FIG. 4B shows another aftertreatment system 40B that comprises a diesel oxidation catalyst 42 (depicted as "D.O.C.") in series with a flow-through filter 46 (depicted as "F.T.F."). In this manner, the exhaust stream 66 from the EGR manifold 22 (See FIGS. 1-2) flows through the diesel oxidation catalyst 42, then through the flow-through filter 46 and then flows, via arrow 68, to the EGR cooler 30 (See FIGS. 1-2).

Other embodiments of aftertreatment systems 40 may be employed without departing from aspects of the present invention. For example the aftertreatment system may comprise one of a diesel particulate filter, a diesel oxidation catalyst, a flow-through filter, a three-way catalyst, and a selective catalytic reduction catalyst, and combinations thereof.

Figure 5:
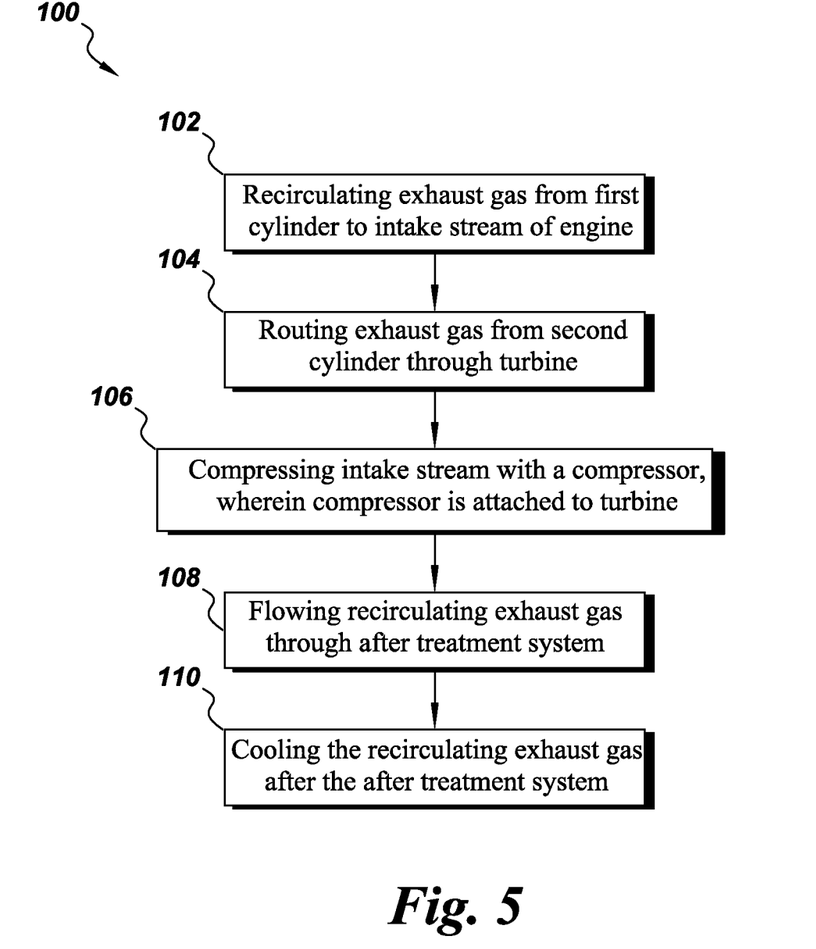
FIG. 5 is a flowchart depicting an embodiment of a method incorporating aspects of the present invention.

Referring to FIG. 5, a flowchart of an embodiment of a method of the present invention is depicted. The method 100 comprises recirculating exhaust gas from a first cylinder (e.g., donor cylinder) of an engine to an intake stream of the engine at 102. Exhaust gas from the second cylinder (e.g., non-donor cylinder) is routed through a turbine at 104. At 106, a compressor, operatively attached to the turbine, compresses the intake stream to both the first and second cylinders. The recirculated exhaust gas is flowed through an aftertreatment system at 108. After the recirculated exhaust gas flows through the aftertreatment system it is then cooled (e.g., by an EGR cooler) at 110.

Figure 6:
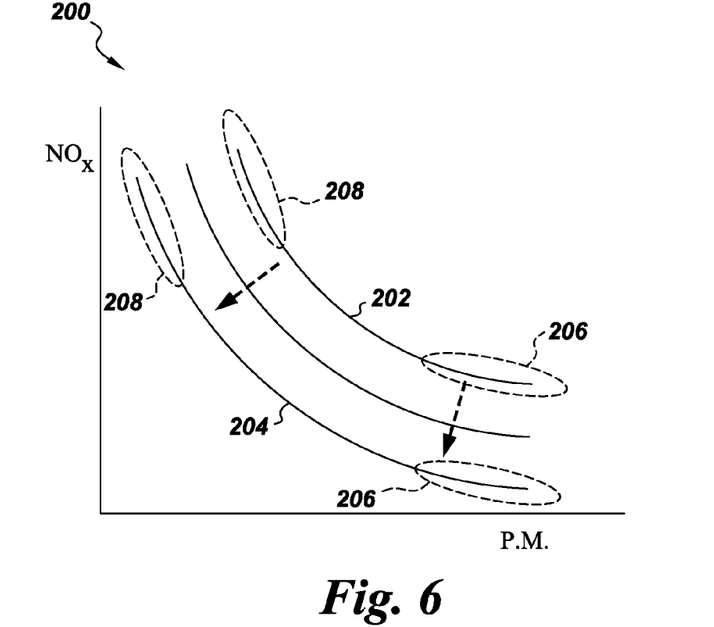
FIG. 6 is a graph depicting a relationship between $NO_x$ and particulate matter, as utilized by aspects of the present invention.

Referring to FIG. 6, the relationship between $NO_x$ and particulate matter (P.M.) generated by the engine is depicted as 200. As shown, in general, curve 202 depicts the inverse relationship between particulate matter (P.M.) and $NO_x$ generated. Aspects of the present invention when employed have been discovered to advantageously move, or "drive", the resultant curve downwards towards curve 204. The donor cylinders 14 of the engine 10 contribute to the portion of the curve labeled 206, such that $NO_x$ is effectively reduced. Similarly, the non-donor cylinders 16 of the engine 10 contribute to the portion of the curve labeled 208, such that particulate matter is effectively reduced. Stated differently, aspects of the present invention provide an engine 10 that reduces both $NO_x$ and P.M. because although the donor cylinder 14 operates at a high, or higher, P.M, the P.M is filtered out and does not contribute to the engine-out emissions. In this way the donor cylinder 14 acts as a low-$NO_x$, low-P.M. cylinder and the non-donor cylinder 16 acts as a high-$NO_x$, low-P.M. high-efficiency cylinder. In this manner both $NO_x$ and particulate matter are both effectively reduced and fuel efficiency is improved.

Figure 7:
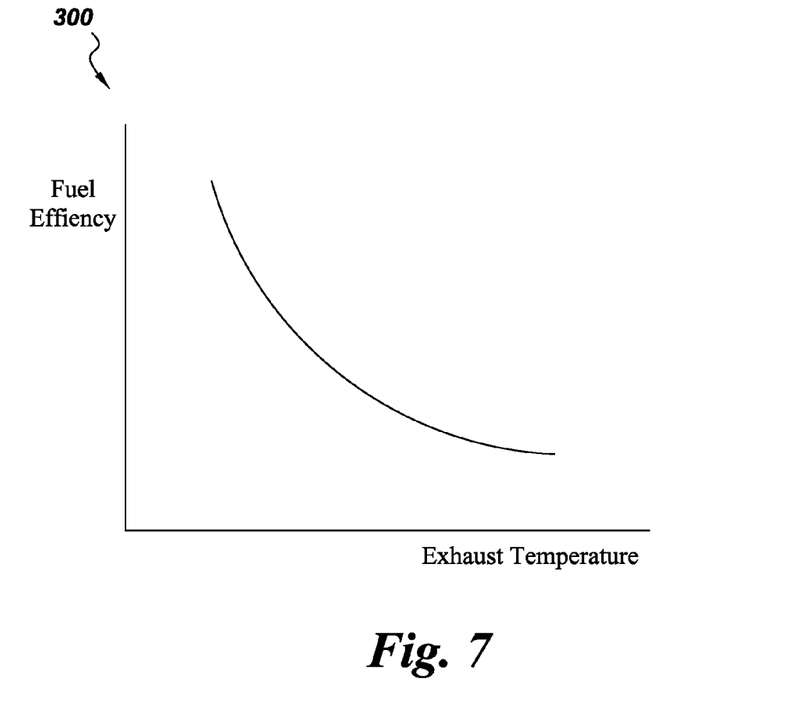
FIG. 7 is a graph depicting a relationship between fuel efficiency and exhaust temperature, as utilized by aspects of the present invention.

Referring to FIG. 7, the relationship between fuel efficiency and exhaust temperature is depicted as 300. Aspects of the present invention harness the relationship by lowering exhaust temperature, via EGR cooling, and thereby aiding in improving fuel efficiency.

Therefore, according to one embodiment of the present invention, a method comprises: flowing exhaust gas from a first cylinder of a reciprocating engine through an after treatment system; cooling the exhaust gas after the after treatment system; recirculating the exhaust gas from the first cylinder to an intake stream or air-fuel mixture of the first cylinder and a second cylinder of the reciprocating engine; routing exhaust gas from the second cylinder through a turbine; compressing the intake stream or air-fuel mixture to the first cylinder and the second cylinder with a compressor, wherein the compressor is operatively attached to the turbine.

In accordance with another aspect of the invention, an engine comprises: a first reciprocating cylinder; a second reciprocating cylinder; an exhaust manifold, configured to provide an egress path for exhaust emissions from the first reciprocating cylinder and the second reciprocating cylinder; an intake manifold, configured to provide an input path for an air fuel mixture to the first reciprocating cylinder and the second reciprocating cylinder; and an exhaust gas recirculating (EGR) subsystem comprising: an after treatment system; and an EGR cooler in series with said after treatment system, wherein the EGR subsystem routes exhaust emissions from the first reciprocating cylinder back to the intake manifold.

In accordance with another aspect of the invention, a method comprises: routing air to a donor cylinder and a non-donor cylinder of a reciprocating engine; combusting an air fuel mixture in the donor cylinder and the non-donor cylinder; routing exhaust gas from the non-donor cylinder through an exhaust manifold; and recirculating exhaust gas from the donor cylinder through an aftertreatment system and a cooler back to the intake manifold of the donor cylinder and the non-donor cylinder.

In accordance with another aspect of the invention, a method comprises: recirculating exhaust gas from a first cylinder of a reciprocating engine to an intake stream or air-fuel mixture of the first cylinder and a second cylinder of the reciprocating engine, whereby: the recirculated exhaust gas from the first cylinder flows through an after treatment system; and the recirculated exhaust gas is cooled to a lower temperature after the after treatment system; and routing exhaust gas from the second cylinder through an exhaust manifold.

In accordance with another aspect of the invention, a method comprises: flowing recirculating exhaust gas from a first cylinder of a reciprocating engine through an after treatment system; cooling the recirculating exhaust gas after the after treatment system; recirculating exhaust gas from a first cylinder of the reciprocating engine to a compressor; routing exhaust gas from the second cylinder through a turbine; and compressing the intake stream or air-fuel mixture to the first cylinder and the second cylinder and the recirculating exhaust gas with a compressor, wherein the compressor is operatively attached to the turbine.

In accordance with another aspect of the invention, a method comprises: recirculating exhaust gas from a first cylinder of a reciprocating engine back to the reciprocating engine; flowing the recirculating exhaust gas through an after treatment system and a first turbine; cooling the recirculating exhaust gas after the first turbine; compressing the recirculating exhaust gas after the cooling with a first compressor, wherein the first compressor is operatively attached to the first turbine; recirculating the compressed recirculating exhaust gas to the intake stream or air-fuel mixture to the first cylinder and the second cylinder; routing exhaust gas from the second cylinder through a second turbine; and compressing the intake stream or air-fuel mixture of the second cylinder with a second compressor, wherein the compressor is operatively attached to the second turbine.

The present invention has been described in terms of the preferred embodiment, and it is recognized that equivalents, alternatives, and modifications, aside from those expressly stated, are possible and within the scope of the appending claims.

What is claimed is:

1. A method comprising:
   flowing exhaust gas from a first cylinder of a reciprocating engine through an after treatment system;
   cooling the exhaust gas after the after treatment system;
   recirculating the exhaust gas from the first cylinder to an intake stream or air-fuel mixture of the first cylinder and a second cylinder of the reciprocating engine;
   routing at least a portion of the exhaust gas from the second cylinder through a first turbine;
   compressing the intake stream or air-fuel mixture to the first cylinder and the second cylinder with a compressor, wherein the compressor is operatively attached to at least one of the first turbine or a second turbine;
   directly injecting at least one fuel directly into one of the first cylinder and the second cylinder;
   retarding an injection timing of the first cylinder; and
   advancing an injection timing of the second cylinder.

2. The method of claim 1 wherein the reciprocating engine operates on diesel fuel.

3. The method of claim 1, wherein the reciprocating engine operates on gasoline fuel.

4. The method of claim 1, wherein the reciprocating engine operates on one of natural gas fuel, syngas, landfill gas, a $CO/H_2$ mixture, methanol, ethanol, a single component alcohol, blended alcohol, and combinations thereof.

5. The method of claim 1 wherein the reciprocating engine operates on a plurality of fuels.

6. The method of claim 5, wherein the plurality of fuels comprise diesel and one of natural gas and ethanol.

7. The method of claim 1, further comprising providing the first reciprocating cylinder with an air fuel mixture having a first air/fuel ratio and providing the second reciprocating cylinder with an air fuel mixture having a second air/fuel ratio, wherein the first air/fuel ratio is less than the second air/fuel ratio.

8. The method of claim 1, wherein the after treatment system comprises one of a diesel particulate filter, a diesel oxidation catalyst, a flow-through filter, a three-way catalyst, and a selective catalytic reduction catalyst.

9. The method of claim 1, further comprising:
increasing an amount of fuel supplied to the first cylinder; and
decreasing an amount of fuel supplied to the second cylinder, so as to maintain a predetermined power output from the reciprocating engine.

10. An engine comprising:
a first reciprocating cylinder;
a second reciprocating cylinder;
an exhaust manifold, configured to provide an egress path for exhaust emissions from the first reciprocating cylinder and the second reciprocating cylinder;
an intake manifold, configured to provide an input path for an air fuel mixture to the first reciprocating cylinder and the second reciprocating cylinder;
an exhaust gas recirculating (EGR) subsystem comprising:
an after treatment system; and
an EGR cooler in series with said after treatment system, wherein the EGR subsystem routes exhaust emissions from the first reciprocating cylinder back to the intake manifold; and
a direct injection means, configured to directly inject at least one fuel into one of the first cylinder and the second cylinder, further wherein at least one of:
an injection timing of the first cylinder is retarded as compared to an injection timing of the second cylinder; and
an injection timing of the second cylinder is advanced as compared to an injection timing of the first cylinder.

11. The engine of claim 10, wherein the first reciprocating cylinder receives an air fuel mixture having a first air/fuel ratio and the second reciprocating cylinder receives an air fuel mixture having a second air/fuel ratio, wherein the first air/fuel ratio is less than the second air/fuel ratio.

12. The engine of claim 10, wherein the after treatment system comprises one of a diesel particulate filter, a diesel oxidation catalyst, a flow-through filter, a three-way catalyst, and a selective catalytic reduction catalyst.

13. The engine of claim 10, further comprising a turbocharger, the turbocharger comprising a turbine operatively attached to a compressor, wherein the exhaust emissions from the second reciprocating cylinder is routed to the turbine, and compressed intake air from the compressor is routed to the intake manifold.

14. The engine of claim 10, wherein the engine operates on diesel fuel.

15. The engine of claim 10, wherein the engine operates on gasoline fuel.

16. The engine of claim 10, wherein the engine operates on one of natural gas fuel, syngas, landfill gas, a $CO/H_2$ mixture, methanol, ethanol, a single component alcohol, blended alcohol, and combinations thereof.

17. The engine of claim 10, wherein the engine operates on a plurality of fuels.

18. The engine of claim 17, wherein the plurality of fuels comprise diesel and one of natural gas and ethanol.

19. The engine of claim 10, further wherein an amount of fuel supplied to the first cylinder is greater than an amount of fuel supplied to the second cylinder.

20. A method comprising:
routing air to a donor cylinder and a non-donor cylinder of a reciprocating engine;
combusting an air fuel mixture in the donor cylinder and the non-donor cylinder;
routing exhaust gas from the non-donor cylinder through an exhaust manifold;
recirculating exhaust gas from the donor cylinder through an aftertreatment system and a cooler back to the intake manifold of the donor cylinder and the non-donor cylinder;
directly injecting at least one fuel directly into one of the first cylinder and the second cylinder;
retarding an injection timing of the first cylinder; and
advancing an injection timing of the second cylinder.

21. The method of claim 20, wherein the reciprocating engine operates on diesel fuel.

22. The method of claim 20, wherein the reciprocating engine operates on gasoline fuel.

23. The method of claim 20, wherein the reciprocating engine operates on one of natural gas fuel, syngas, landfill gas, a $CO/H_2$ mixture, methanol, ethanol, a single component alcohol, blended alcohol, and combinations thereof.

24. The method of claim 20, wherein the reciprocating engine operates on a plurality of fuels.

25. The method of claim 24, wherein the plurality of fuels comprise diesel and one of natural gas and ethanol.

26. The method of claim 20, further comprising providing the first reciprocating cylinder with an air fuel mixture having a first air/fuel ratio and providing the second reciprocating cylinder with an air fuel mixture having a second air/fuel ratio, wherein the first air/fuel ratio is less than the second air/fuel ratio.

27. The method of claim 20, wherein the after treatment system comprises one of a diesel particulate filter, a diesel oxidation catalyst, a flow-through filter, a three-way catalyst, and a selective catalytic reduction catalyst.

28. The method of claim 20, further comprising:
increasing an amount of fuel supplied to the first cylinder; and
decreasing an amount of fuel supplied to the second cylinder, so as to maintain a predetermined power output from the reciprocating engine.

29. A method comprising:
recirculating exhaust gas from a first cylinder of a reciprocating engine to an intake stream or air-fuel mixture of the first cylinder and a second cylinder of the reciprocating engine, whereby:
the recirculated exhaust gas from the first cylinder flows through an after treatment system; and
the recirculated exhaust gas is cooled to a lower temperature after the after treatment system;
routing exhaust gas from the second cylinder through an exhaust manifold;
directly injecting at least one fuel directly into one of the first cylinder and the second cylinder; and one of:
retarding an injection timing of the first cylinder; and
advancing an injection timing of the second cylinder.

30. The method of claim 29, wherein the reciprocating engine operates on diesel fuel.

31. The method of claim 29, wherein the reciprocating engine operates on gasoline fuel.

32. The method of claim 29, wherein the reciprocating engine operates on one of natural gas fuel, syngas, landfill gas, a $CO/H_2$ mixture, methanol, ethanol, a single component alcohol, blended alcohol, and combinations thereof.

33. The method of claim 29, wherein the reciprocating engine operates on a plurality of fuels.

34. The method of claim 33, wherein the plurality of fuels comprise diesel and one of natural gas and ethanol.

35. The method of claim 29, further comprising providing the first cylinder with an air fuel mixture having a first air/fuel ratio and providing the second cylinder with an air fuel mixture having a second air/fuel ratio, wherein the first air/fuel ratio is less than the second air/fuel ratio.

36. The method of claim 29, wherein the after treatment system comprises one of a diesel particulate filter, a diesel oxidation catalyst, a flow-through filter, a three-way catalyst, and a selective catalytic reduction catalyst.

37. The method of claim 29, further comprising:
increasing an amount of fuel supplied to the first cylinder; and
decreasing an amount of fuel supplied to the second cylinder, so as to maintain a predetermined power output from the reciprocating engine.

38. A method comprising:
flowing recirculating exhaust gas from a first cylinder of a reciprocating engine through an after treatment system;
cooling the recirculating exhaust gas after the after treatment system, wherein the after treatment system comprises one of a diesel particulate filter, a diesel oxidation catalyst, a flow-through filter, a three-way catalyst, and a selective catalytic reduction catalyst;
recirculating exhaust gas from a first cylinder of the reciprocating engine to a compressor;
routing exhaust gas from the second cylinder through a turbine;
compressing the intake stream or air-fuel mixture to the first cylinder and the second cylinder and the recirculating exhaust gas with a compressor, wherein the compressor is operatively attached to the turbine;
directly injecting at least one fuel directly into one of the first cylinder and the second cylinder; and one of:
retarding an injection timing of the first cylinder; and
advancing an injection timing of the second cylinder.

39. The method of claim 38, wherein the reciprocating engine operates on diesel fuel.

40. The method of claim 38, wherein the reciprocating engine operates on gasoline fuel.

41. The method of claim 38, wherein the reciprocating engine operates on one of natural gas fuel, syngas, landfill gas, a $CO/H_2$ mixture, methanol, ethanol, a single component alcohol, blended alcohol, and combinations thereof.

42. The method of claim 38, wherein the reciprocating engine operates on a plurality of fuels.

43. The method of claim 42, wherein the plurality of fuels comprise diesel and one of natural gas and ethanol.

44. The method of claim 38, further comprising providing the first cylinder with an air fuel mixture having a first air/fuel ratio and providing the second cylinder with an air fuel mixture having a second air/fuel ratio, wherein the first air/fuel ratio is less than the second air/fuel ratio.

45. The method of claim 38, further comprising:
increasing an amount of fuel supplied to the first cylinder; and
decreasing an amount of fuel supplied to the second cylinder, so as to maintain a predetermined power output from the reciprocating engine.

46. A method comprising:
recirculating exhaust gas from a first cylinder of a reciprocating engine back to the reciprocating engine;
flowing the recirculating exhaust gas through an after treatment system and a first turbine;
cooling the recirculating exhaust gas after the first turbine;
compressing the recirculating exhaust gas after the cooling with a first compressor, wherein the first compressor is operatively attached to the first turbine;
recirculating the compressed recirculating exhaust gas to the intake stream or air-fuel mixture to the first cylinder and the second cylinder;
routing exhaust gas from the second cylinder through a second turbine; and
compressing the intake stream or air-fuel mixture of the second cylinder with a second compressor, wherein the compressor is operatively attached to the second turbine.

47. The method of claim 46, wherein the reciprocating engine operates on diesel fuel.

48. The method of claim 46, wherein the reciprocating engine operates on gasoline fuel.

49. The method of claim 46, wherein the reciprocating engine operates on one of natural gas fuel, syngas, landfill gas, a $CO/H_2$ mixture, methanol, ethanol, a single component alcohol, blended alcohol, and combinations thereof.

50. The method of claim 46, wherein the reciprocating engine operates on a plurality of fuels.

51. The method of claim 50, wherein the plurality of fuels comprise diesel and one of natural gas and ethanol.

52. The method of claim 46, further comprising providing the first cylinder with an air fuel mixture having a first air/fuel ratio and providing the second cylinder with an air fuel mixture having a second air/fuel ratio, wherein the first air/fuel ratio is less than the second air/fuel ratio.

53. The method of claim 46, wherein the after treatment system comprises one of a diesel particulate filter, a diesel oxidation catalyst, a flow-through filter, a three-way catalyst, and a selective catalytic reduction catalyst.

54. The method of claim 53, further comprising directly injecting at least one fuel directly into one of the first cylinder and the second cylinder.

55. The method of claim 54, further comprising one of:
retarding an injection timing of the first cylinder; and
advancing an injection timing of the second cylinder.

56. The method of claim 55, further comprising:
increasing an amount of fuel supplied to the first cylinder; and
decreasing an amount of fuel supplied to the second cylinder, so as to maintain a predetermined power output from the reciprocating engine.

\* \* \* \* \*